United States Patent [19]
Cosson

[11] Patent Number: 4,884,391
[45] Date of Patent: Dec. 5, 1989

[54] STALK CUTTING APPARATUS

[76] Inventor: Keith J. Cosson, 416 N. Washington, Grand Island, Nebr. 68801

[21] Appl. No.: 237,978

[22] Filed: Aug. 29, 1988

[51] Int. Cl.$^4$ .......................................... A01D 45/00
[52] U.S. Cl. .......................................... 56/53; 56/60
[58] Field of Search ...................................... 56/53–60, 56/64, 77, 503, 504; 30/297, 309

[56] References Cited

U.S. PATENT DOCUMENTS

| | | | |
|---|---|---|---|
| 373,370 | 11/1887 | Johnson | 56/60 |
| 534,266 | 2/1895 | Ivins et al. | 56/60 |
| 849,659 | 4/1907 | Cooper | 56/60 |
| 1,248,517 | 12/1917 | McNally et al. | 56/60 |
| 4,594,842 | 6/1986 | Wolters et al. | 56/60 |

Primary Examiner—Thuy M. Bui
Attorney, Agent, or Firm—Dean P. Edmundson

[57] ABSTRACT

Apparatus is described for cutting corn stalks and other plant stems in the field after harvesting. The apparatus is towed behind a tractor and includes: (a) a frame, (b) a rotatable cutter wheel carried by the frame and including a plurality of transverse cutting knives around its periphery, and (c) a plurality of spaced-apart, vertically oriented rotatable coulters carried by the frame. The transverse knives cut stalks which are longitudinally oriented on the ground and the coulters cut stalks which are transversely oriented (i.e., cross-wise) on the ground. A sweep member can be included at the leading end of the frame for loosening the butts of corn stalks from the ground.

26 Claims, 4 Drawing Sheets

STALK CUTTING APPARATUS

FIELD OF THE INVENTION

This invention relates to apparatus and techniques for cutting corn stalks and other plant stems after harvesting is completed. More particularly, this invention relates to apparatus which is towed behind a tractor.

BACKGROUND OF THE INVENTION

After corn is harvested in the fall by removing the ears (either with a corn picker or a combine), the stalks remain in the field. The base or butt ends of the stalks remain attached in the soil in rows. Before the field can be planted in corn in the next growing season the stalks from the prior crop must be removed or cut into small pieces so as not to interfere with the planting and cultivating of the new crop.

In accordance with minimum-tillage or no-tillage techniques, the stalks are not plowed under after one crop has been harvested, nor is the soil re-worked. Rather, the seeds for the new crop are planted in the same bed which was used for the last crop. In such event, the butt ends of the stalks must be loosened from the soil and moved off of the bed.

Although a variety of stalk cutters have been previously used, such cutters involve the use of flails, knives, or chains which are driven at high speed to break or cut the stalks into small pieces. This requires considerable power to drive such cutters. Furthermore, much dust is created, and there is also danger associated with flying stones, stalk pieces, and other debris. Moreover, such cutters are not capable of cutting or shredding any debris or stalks which lie on the ground between the rows. Another disadvantage of such cutters is that the knives which are used wear out quickly, and there is much maintenance required in order to keep such cutters in good working condition. Still another disadvantage of such cutters is that they can ruin the bed where the new crop is to be planted.

There has not heretofore been provided a stalk cutter which is efficient, safe and effective in operation and which is capable of being used in minimum-tillage or no-tillage operations. The present invention provides stalk cutting apparatus which overcomes the disadvantages of previously available machines.

SUMMARY OF THE PRESENT INVENTION

In accordance with the present invention there is provided stalk cutting apparatus which is capable of cutting corn stalks and other plant stems into small pieces after harvesting of the crop from the field. In one embodiment the apparatus of the invention includes:
(a) a frame member which is adapted to be detachably connected to a hitch on a tractor;
(b) a rotatable cutter wheel carried by the frame, the cutter wheel including a plurality of cutting knives around the periphery of the wheel; and
(c) a plurality of spaced-apart, vertically oriented rotatable coulters carried by the frame.

The cutting knives on the periphery of the cutter wheel each have a cutting edge which is oriented transversely to the direction of travel of the apparatus (i.e., the cutting edge is transverse to the longitudinal centerline of the apparatus). The coulters are aligned parallel to the longitudinal direction of the apparatus.

Thus, as the apparatus is towed across a field in the direction of the rows the cutter wheel cuts stalks which are lying in a longitudinal direction. The coulters cut stalks which are not lying in a longitudinal direction (i.e., those which are wholly or in part cross-wise to the direction of the apparatus). In this manner the apparatus is capable of cutting all of the stalks into short pieces so that they do not interfere with subsequent planting and tilling operations.

In a preferred embodiment a sweep member is carried by the frame ahead of the cutter wheel and coulters to loosen the butt ends of the stalks from the soil and to urge them into the path of the cutter wheel and coulters. This technique also prepares the bed for planting of a new corn crop.

Preferably there are a plurality of individual cutting units carried by the frame in side-by-side fashion. Each cutting unit passes between adjacent rows when the sweep member is used. The coulters are preferably carried or mounted on a sub-frame attached beneath the frame in a manner such that the sub-frame can pivot slightly about a transverse axle. This allows the coulters to follow the contour of the ground very well. Springs can be included to urge the coulters downwardly to assure that the stalks are cut through.

The apparatus of the invention is useful, of course, in cutting other types of plant stems and stalks also.

Other advantages of the stalk cutting apparatus of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
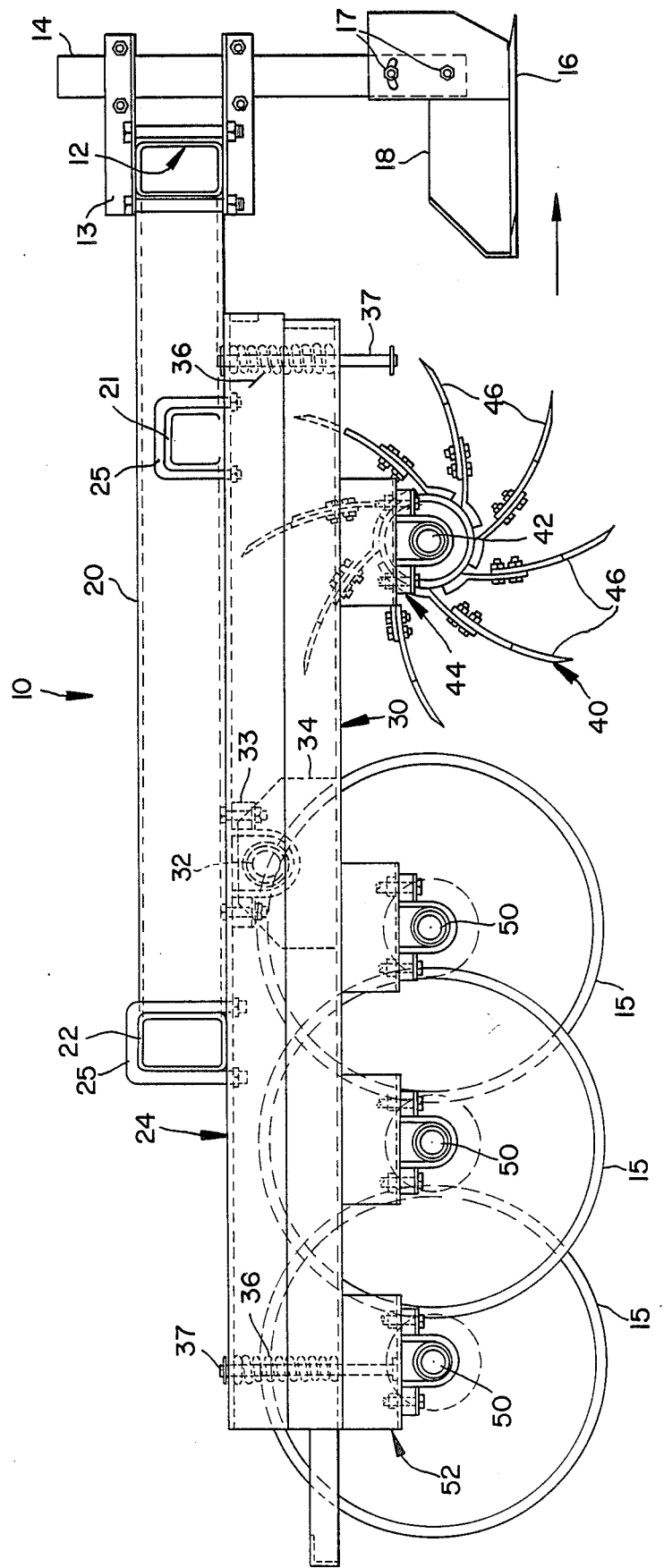
FIG. 1 is a side elevational view of one embodiment of stalk cutting apparatus of the invention.

In the drawings there is shown stalk cutting apparatus 10 of the invention comprising an elongated tool bar 12 which is oriented transversely and which can be detachably connected to the hitch of a conventional tractor (e.g., it may include appropriate attachment sites so as to be capable of being attached to the three-point hitch of a tractor).

Attached to the tool bar 12 at the leading end of the apparatus there are preferably a plurality of downwardly depending shanks 14. Attachment bracket 13 enables each shank to be vertically and horizontally adjusted relative to the tool bar.

Figure 5:
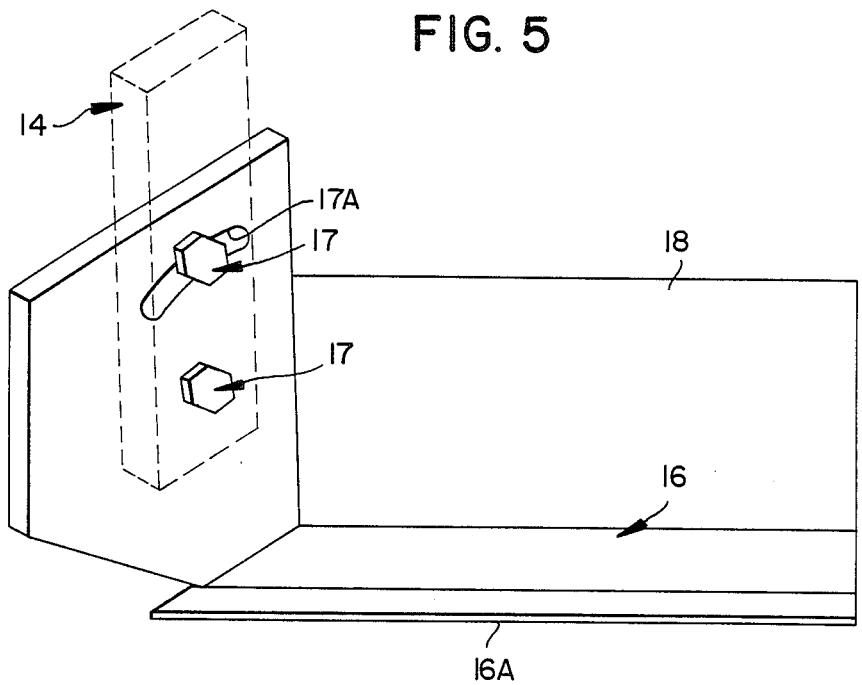
FIG. 5 is a perspective view of a preferred embodiment of sweep member used in this invention.

Attached to the lower end of each shank 14 is a sweep member which includes a horizontally projecting knife 16 (having leading edge 16A) and an upstanding wall or deflector 18. The attitude of the knife 16 can be adjusted on the lower end of shank 14 by loosening bolts 17 and tilting the sweep forwardly or rearwardly. Slot 17A permits the sweep to be tilted, as illustrated in FIG. 5. Then bolts 17 can be tightened again.

This sweep member is preferably positioned such that it runs through the soil about 2 to 4 inches deep in the row (i.e., where the corn stalks attach to the soil) so as to loosen or cut the butts of the stalks and urge them into the area between the rows where the cutter wheel and coulters cut the stalks into short lengths. Because the knife 16 is in a horizontal plane it also leaves a generally flat surface or bed in the soil as it is towed across the field. This allows a new crop to be planted in the same bed as was used for the preceding crop.

The sweep member of this invention may also be mounted at the front of a planter for the same purpose, i.e., to remove the butts of the stalks from a harvested crop and prepare a bed for planting a new crop. One such sweep member is used for each row.

The leading edge of the knife portion is preferably a straight edge. It is also preferable for the leading edge of the knife to angle rearwardly about 30 to 60 degrees (more preferably 45 degrees).

The length of the knife portion may vary. Typically a length in the range of about 10 to 15 inches is sufficient. The deflector portion is situated above the knife portion. Preferably the deflector portion rests on the trailing edge of the knife (as illustrated in FIG. 5) and extends upwardly in a vertical plane a few inches (e.g., about 4 to 6 inches). Preferably the deflector portion extends along the entire length of the knife.

The length of tool bar 12 may vary, as desired. A plurality of sweep members are carried by the tool bar, as explained above. One such sweep member is present for each row of stalks. For example, there may be 5, or 7, or 9, or any desired number of sweep members and cutter units included.

Each sweep member is positioned on the tool bar in a manner such that the knife portion travels along the center of a row of stalks to sever or loosen the base or butt end of the stalks, after which the deflector portion urges the stalks into the area between the rows where the cutting units are positioned.

Figure 3:
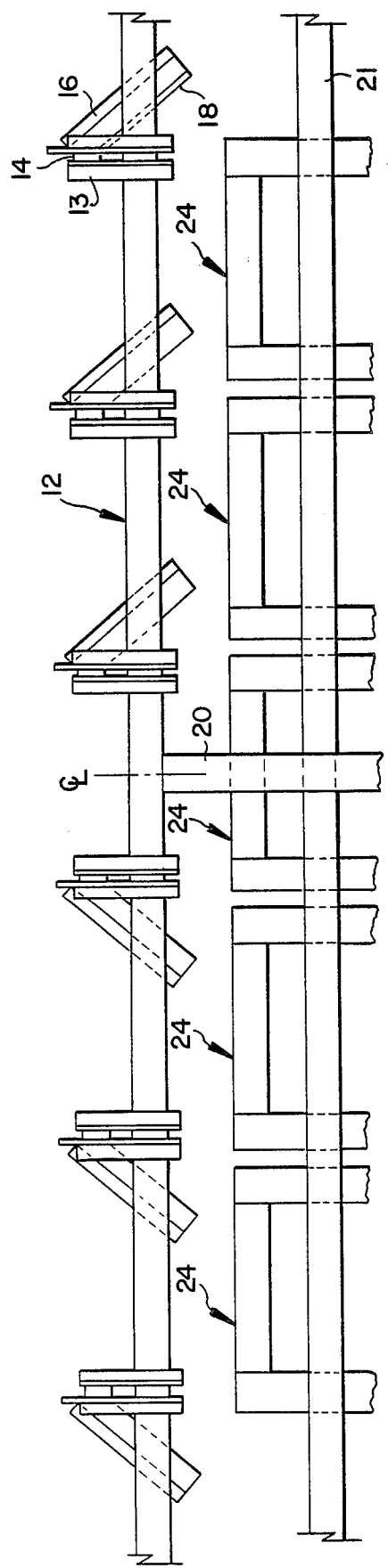
FIG. 3 is another fragmentary top view of the embodiment shown in FIG. 1.

As illustrated in FIG. 3, the sweep members on one side of the longitudinal centerline CL of the apparatus urge stalks to the right and the sweep members on the opposite side of the centerline urge stalks to the left. This arrangement is advantageous when the centerline of the apparatus is positioned between the rows where a combine used for harvesting the crop has distributed trash and debris. In other words, no additional stalks or debris is pushed into the area where the combine has already distributed debris.

Figure 2:
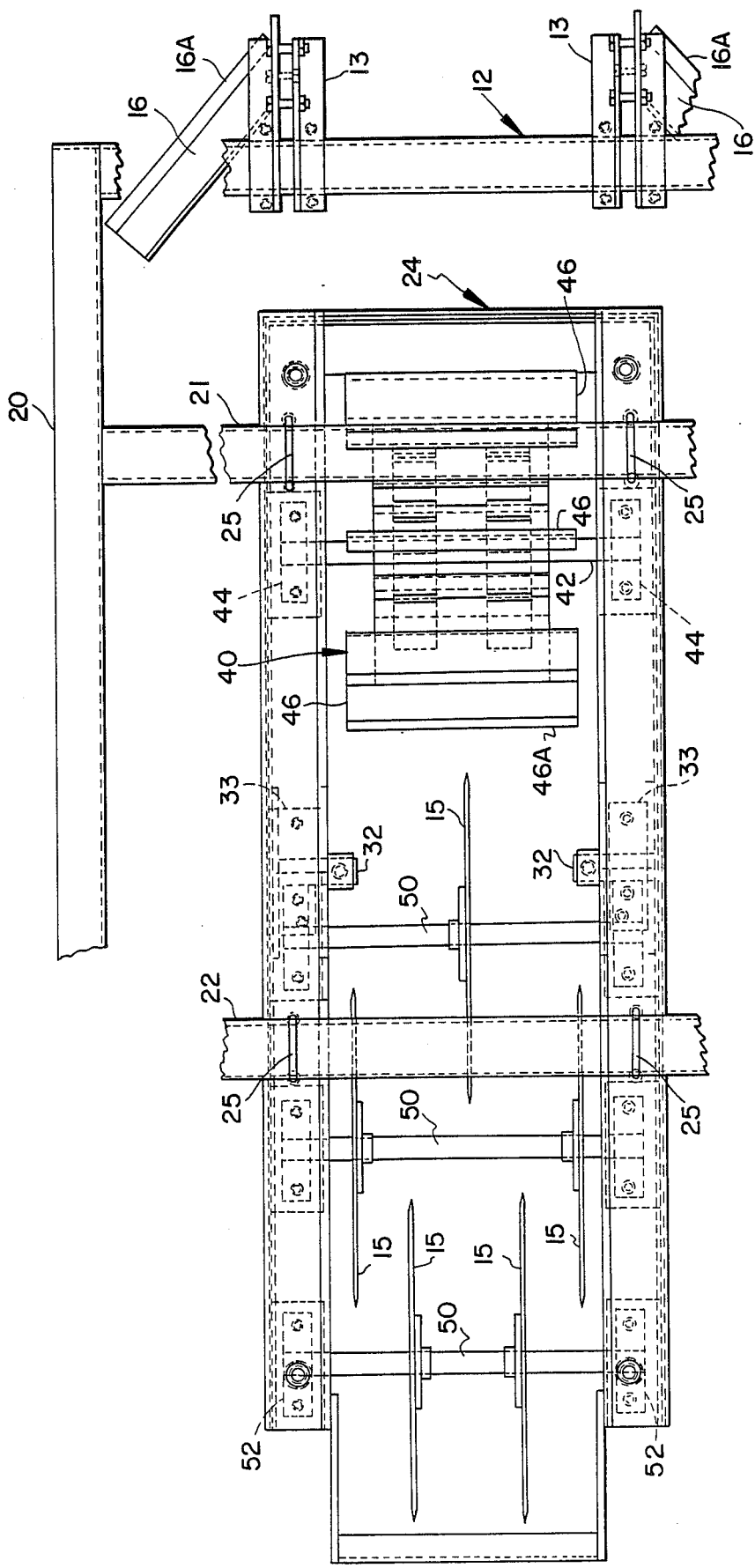
FIG. 2 is a fragmentary top view of the apparatus shown in FIG. 1.

Extending rearwardly from tool bar 12 in a longitudinal direction is a frame portion 20. Extending transversely from frame portion 20, and being secured thereto, are frame portions 21 and 22. Rectangular frame members 24 are carried on the underside of frame portions 21 and 22. This is illustrated in FIGS. 1 and 2. For example, U-bolts 25 may be used for this purpose.

Preferably a rectangular sub-frame 30 is carried below the frame 24, as illustrated in FIG. 1. It is preferable for the sub-frame 30 to be pivotably attached to frame 24 near its mid-point so that the sub-frame can pivot slightly as the apparatus is towed across a field. For example, axles 32 are carried by opposite sides of sub-frame 24 by means of clamps or brackets 33. Hanger 34 on each side of sub-frame 30 attaches to an axle 32 and allows pivotal movement.

Springs 36 are preferably connected between frame 24 and sub-frame 30 in order to urge sub-frame 30 downwardly. The springs are preferably located at each end of sub-frame 30. A pin 37 may be passed through the center of each spring and through registering openings in frame 24 and sub-frame 30 for alignment and retention purposes, as illustrated.

The combination of the pivotal attachment of sub-frame 30 to frame 24 and the springs 36 at each end of the sub-frame result in a very beneficial action. The pivoting ability allows the cutter wheel 40 and the coulters 15 to follow the contour of the ground as the apparatus is towed across the field, and the springs 36 absorb and reduce shock to the apparatus.

Cutter wheel 40 is rotatably supported at the leading end of sub-frame 30. For example, it can be carried on shaft or axle 42 which is mounted to the lower side of sub-frame 30 by means of clamps 44 to support sealed ball bearings in which axle 42 rotates.

The cutting wheel 40 includes a plurality of cutting knives 46 at its periphery. Each knife includes a transverse cutting edge 46A having a length of about 6 to 20 inches. The spacing between the cutting edges of adjacent knives is a few inches (e.g., about 6 to 10 inches). The diameter of the wheel 40 may be, for example, about 25 inches. Other sizes could also be used.

The cutter wheel 40 is freely rotatable by means of axle 42. When the apparatus is lowered to engage the ground, the cutting edges of knives 46 preferably extend into the ground about 2 to 7 inches (preferably so that the cutting edges of the knives penetrate the soil down t the hardpan). As the apparatus is towed forwardly the cutting edge of each knife cuts through any stalks or other stem material in its path. The cutter wheel rotates as the apparatus is towed forwardly because of its engagement with the ground.

The distance between the cutting edges of adjacent knives determines the length of the cut stalks or other materials. The closer the knives are to each other the shorter the length of the stalk sections being cut.

Because the cutting edge of the knives of the cutter wheel are disposed transversely to the path of travel, the knives cut stalks which are lying on the ground in primarily a longitudinal direction.

Following behind the cutter wheel are a plurality of rotatable coulters 15 which are mounted on or carried by axles 50 which are carried by sub-frame 30 by means of clamps or brackets 52. At least one coulter is carried by each axle. The coulters are staggered (i.e., spaced-apart) so that each coulter has its own longitudinal path as the apparatus is towed across the field.

The edge of each coulter is sharp and cuts through stalks and other material. Because the path of each coulter wheel is longitudinal, it cuts stalks and other material which is lying wholly or in part cross-wise or transverse to the direction of travel.

The spacing between coulters may vary (e.g., from about 2 to 6 inches). The coulters are placed on different axles to prevent plugging or build-up of material in front of the coulters. Thus, for example, the leading coulter is on an axle by itself. Behind that there are two coulters on another axle, the coulters being spaced wide apart. Then on a trailing axle there are two more coulters.

Other arrangements of coulters could also be used. Any number of different axles could be used, for example. At least one coulter is carried on each axle. The spacing between axles may also vary.

The size of the coulters may vary. A preferred size is a diameter of about 24 inches.

Other variants are possible without departing from the scope of this invention. For example, weights could be added to the top of the frame to cause the cutter wheel and coulters to be pushed downwardly with more force. More than one cutter wheel could also be used, if desired.

The sweep members, although preferably included as a part of the apparatus, are considered optional. The apparatus will cut stalks and other plant material very well even if the sweep members are not included.

Figure 4:
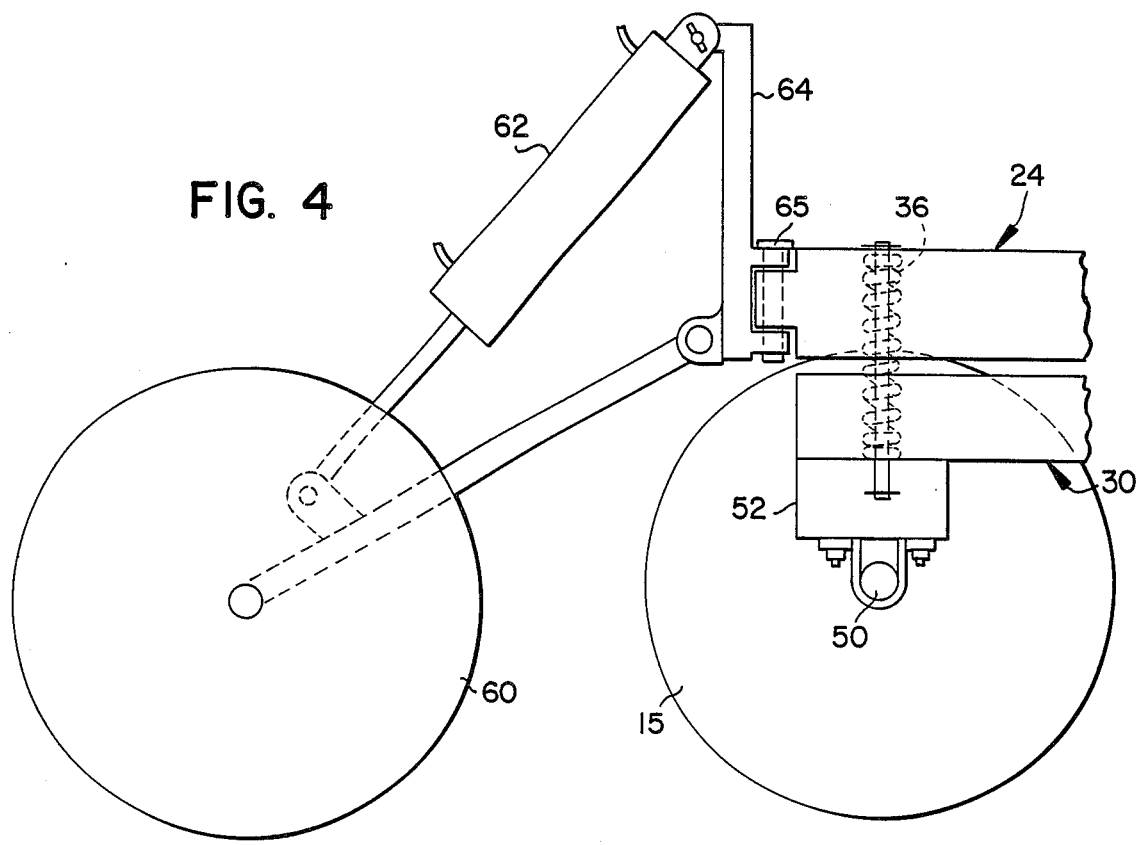
FIG. 4 is a fragmentary side elevational view illustrating another variation of the stalk cutting apparatus of the invention.

When the apparatus of the invention is quite large there may be included one or more (preferably two) gauge or lift wheels on the trailing end thereof. One such wheel is illustrated in FIG. 4. In this figure a wheel 60 is mounted on the rear of frame 24 and may be raised or lowered as desired by means of hydraulic cylinder 62. Preferably the mounting bracket 64 is pivotable (e.g., on pin 65) with respect to frame 24.

It is also possible to use two or more gauge or lift wheels at other positions on the frame to assist in raising the apparatus off the ground for transport. The apparatus of this invention may include a tongue which is adapted for attachment to the drawbar of a tractor (i.e., the apparatus may be a pull-type unit). Alternatively, the apparatus may be attached to the three-point hitch of a tractor (with gauge or lift wheels preferably being positioned at the rear of the apparatus to assist in raising the apparatus off the ground).

The stalk cutting apparatus is self-propelled (i.e., ground driven) and therefore does not require any power-take-off drive.

What is claimed is:

1. Stalk cutting apparatus for towing behind a tractor for cutting corn stalks and other plant stems into short lengths, wherein said tractor includes a hitch; said apparatus comprising:
   (a) a frame member adapted to be towed by said tractor; said frame member having leading and trailing ends; said frame member further comprising at least one wheel rotatably carried by said trailing end of said frame member; wherein said wheel is movable between raised and lowered positions;
   (b) a rotatable cutter wheel carried by said frame; said cutter wheel comprising a plurality of cutting knives around the periphery thereof; wherein each said knife includes a cutting edge which is oriented transversely with respect to the longitudinal centerline of said apparatus;
   (c) a plurality of spaced-apart, vertically oriented rotatable coulters carried by said frame member; wherein said knives on said cutter wheel are adapted to cut stalks which are longitudinally oriented and said coulters are adapted to cut stalks which are transversely oriented with respect to the longitudinal centerline of the apparatus.

2. Apparatus in accordance with claim 1, further comprising a plurality of axles carried by said frame member, wherein at least one of said coulters is mounted on each said axle.

3. Apparatus in accordance with claim 1, wherein said cutter wheel is located forwardly of said coulters.

4. Apparatus in accordance with claim 1, further comprising a downwardly depending shank carried by said leading end of said frame member, wherein a sweep member is attached to said shank which is adapted to loosen the butt ends of said stalks from the ground.

5. Apparatus in accordance with claim 1, further comprising a tool bar secured to said leading end of said frame member, wherein said tool bar is adapted to be detachably connected to said hitch of said tractor.

6. Apparatus in accordance with claim 1, further comprising a sub-frame carried by said frame member; wherein said coulters are supported by said sub-frame; wherein said sub-frame is vertically movable relative to said frame member.

7. Apparatus in accordance with claim 6, further comprising spring members connected between said frame and sub-frame, wherein said spring members are adapted to urge said sub-frame downwardly from said frame.

8. Apparatus in accordance with claim 6, wherein said sub-frame is pivotably supported from said frame member.

9. An agricultural implement for separating stalks of a harvested row crop from the soil and preparing a bed for new planting, said implement comprising:
   (a) an elongated shank;
   (b) a sweep member attached to the lower end of said shank, said sweep member including attachment means for attaching said sweep member to said shank; wherein said sweep member includes a knife portion disposed in a horizontal plane; wherein one end of said sweep member is disposed adjacent the lead edge of said shank and wherein the opposite end of said sweep member projects outwardly and rearwardly relative to said shank; said sweep member further including an upstanding deflector portion above said knife portion;
wherein when said sweep member is towed through the soil said knife portion severs said stalks from the soil, said deflector portion urges said stalks outwardly, and said knife prepares a bed for planting a new row crop.

10. An implement in accordance with claim 9, wherein said knife portion is angled rearwardly about 30 to 60 degrees.

11. Stalk cutting apparatus for towing behind a tractor for cutting corn stalks and other plant stems into short lengths, said apparatus comprising a frame member which is adapted to be towed by said tractor, said apparatus further comprising a downwardly depending shank carried by said leading end of said frame member, wherein a sweep member is attached to said shank which is adapted to loosen the butt ends of said stalks from the ground; said apparatus further comprising a plurality of stalk cutting units carried by said frame member in side-by-side manner; wherein each said stalk cutting unit comprises:
   (a) a rotatable cutter wheel carried by said frame; said cutter wheel comprising a plurality of cutting knives around the periphery thereof; wherein each said knife includes a cutting edge which is oriented transversely with respect to the longitudinal centerline of said apparatus;
   (b) a plurality of spaced-apart, vertically oriented rotatable coulters carried by said frame member; wherein said knives on said cutter wheel are adapted to cut stalks which are longitudinally oriented and said coulters are adapted to cut stalks which are transversely oriented with respect to the longitudinal centerline of the apparatus.

12. Apparatus in accordance with claim 11, further comprising a plurality of axles carried by said frame member, wherein at least one of said coulters is mounted on each said axle; and wherein said cutter wheel is located forwardly of said coulters.

13. Apparatus in accordance with claim 11, further comprising a tool bar secured to said leading end of said frame member, wherein said tool bar is adapted to be detachably connected to said hitch of said tractor.

14. Apparatus in accordance with claim 11, further comprising at least one wheel rotatably carried by said trailing end of said frame member; wherein said wheel is movable between raised and lowered positions.

15. Apparatus in accordance with claim 11, further comprising a sub-frame carried by said frame member; wherein said coulters are supported by said sub-frame; wherein said sub-frame is vertically movable relative to said frame member.

16. Apparatus in accordance with claim 15, further comprising spring members connected between said frame and sub-frame; wherein said spring members are adapted to urge said sub-frame downwardly from said frame.

17. Apparatus in accordance with claim 15, wherein said sub-frame is pivotably supported from said frame member.

18. Stalk cutting apparatus for towing behind a tractor for cutting corn stalks and other plant stems into short lengths, said apparatus comprising a frame member which is adapted to be towed by said tractor, said apparatus further comprising a plurality of stalk cutting units carried by said frame member in side-by-side manner; wherein each said stalk cutting unit comprises:
  (a) a downwardly depending shank having attached thereto a sweep member which is adapted to loosen the butt ends of said stalks from the ground;
  (b) a rotatable cutter wheel carried by said frame; said cutter wheel comprising a plurality of cutting knives around the periphery thereof; wherein each said knife includes a cutting edge which is oriented transversely with respect to the longitudinal centerline of said apparatus;
  (c) a plurality of spaced-apart, vertically oriented rotatable coulters carried by said frame member; wherein said knives on said cutter wheel are adapted to cut stalks which are longitudinally oriented and said coulters are adapted to cut stalks which are transversely oriented with respect to the longitudinal centerline of the apparatus.

19. Apparatus in accordance with claim 18, further comprising a plurality of axles carried by said frame member, wherein at least one of said coulters is mounted on each said axle; wherein said cutter wheel is located forwardly of said coulters.

20. Apparatus in accordance with claim 18, further comprising a tool bar secured to said leading end of said frame member, wherein said tool bar is adapted to be detachably connected to said hitch of said tractor.

21. Apparatus in accordance with claim 18, further comprising at least one wheel rotatably carried by said trailing end of said frame member; wherein said wheel is movable between raised and lowered positions.

22. Apparatus in accordance with claim 18, further comprising a sub-frame carried by said frame member; wherein said coulters are supported by said sub-frame; wherein said sub-frame is vertically movable relative to said frame member.

23. Apparatus in accordance with claim 22, further comprising spring members connected between said frame and sub-frame; wherein said spring members are adapted to urge said sub-frame downwardly from said frame.

24. Apparatus in accordance with claim 22, wherein said sub-frame is pivotably supported from said frame member.

25. Stalk cutting apparatus for towing behind a tractor having a hitch, said apparatus being adapted to cut corn stalks and other plant stems into short lengths, said apparatus comprising:
  (a) a frame member adapted to be towed by said tractor; said frame member having leading and trailing ends;
  (b) a sub-frame carried by said frame member; wherein said sub-frame is pivotably supported from said frame member;
  (c) a rotatable cutter wheel carried by said leading end of said frame member; said cutter wheel comprising a plurality of cutting knives around the periphery thereof; wherein each said knife includes a cutting edge which is oriented transversely with respect to the longitudinal centerline of said apparatus;
  (d) a plurality of spaced-apart, vertically oriented rotatable coulters carried by said sub-frame; wherein said coulters are disposed in rows;
wherein said knives on said cutter wheel are adapted to cut stalks which are longitudinally oriented and said coulters are adapted to cut stalks which are transversely oriented with respect to the longitudinal centerline of the apparatus.

26. Apparatus in accordance with claim 25, further comprising a plurality of axles mounted to said sub-frame, and wherein said coulters are mounted on said axles, and further comprising spring members which are adapted to urge said sub-frame downwardly.

* * * * *